United States Patent
Birru et al.

(10) Patent No.: US 7,111,221 B2
(45) Date of Patent: Sep. 19, 2006

(54) DIGITAL TRANSMISSION SYSTEM FOR AN ENHANCED ATSC 8-VSB SYSTEM

(75) Inventors: Dagnachew Birru, Yorktown Heights, NY (US); Vasanth R. Gaddam, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 435 days.

(21) Appl. No.: 10/127,531

(22) Filed: Apr. 22, 2002

(65) Prior Publication Data

US 2002/0194570 A1 Dec. 19, 2002

Related U.S. Application Data

(60) Provisional application No. 60/324,482, filed on Sep. 24, 2001, provisional application No. 60/295,616, filed on Jun. 4, 2001, provisional application No. 60/280,782, filed on Apr. 2, 2001.

(51) Int. Cl.
H03M 13/00 (2006.01)
(52) U.S. Cl. .................................. 714/755; 714/792
(58) Field of Classification Search ................ 714/795, 714/742, 751, 796, 752, 792, 801, 755, 800, 714/774; 348/607, 611, 614, 609; 375/342, 375/343

See application file for complete search history.

(56) References Cited

U.S. PATENT DOCUMENTS

| | | | |
|---|---|---|---|
| 5,321,725 A * | 6/1994 | Paik et al. | 375/265 |
| 5,648,822 A * | 7/1997 | Hulyalkar | 348/607 |
| 6,167,088 A | 12/2000 | Sethuraman | 375/240 |
| 6,178,209 B1 | 1/2001 | Hulyalkar et al. | 375/341 |
| 6,278,685 B1 | 8/2001 | Yonge et al. | 370/203 |
| 6,285,681 B1 * | 9/2001 | Kolze et al. | 370/442 |
| 6,744,822 B1 * | 6/2004 | Gaddam et al. | 375/265 |
| 6,760,077 B1 * | 7/2004 | Choi et al. | 348/614 |
| 2001/0038650 A1 | 11/2001 | Park et al. | 370/537 |

FOREIGN PATENT DOCUMENTS

WO 0045503 A1 8/2000

OTHER PUBLICATIONS

"ATSC Digital Television Standard (Revision B), Aug. 7, 2001".
US 010278, U.S. Appl. No. 10/118,876, filed Apr. 9, 2002.
US 010173, U.S. Appl. No. 10/078,933, filed Feb. 2, 2002.
"Error Control Techniques for Digital Communication", by Arnold Michelson et al., pp. 160-162, 1984.

* cited by examiner

Primary Examiner—Guy Lamarre
Assistant Examiner—Mujtaba K. Chaudry
(74) Attorney, Agent, or Firm—Larry Liberchuk (57) ABSTRACT

A transmission system includes a first forward error correction unit, a robust processor unit, a trellis encoder unit, a second forward error correction unit, and a transmitter device. The first forward error correction unit encodes packets belonging to robust and normal bit streams. The robust processor unit receives the encoded robust packets and processes the robust packets to generate the robust bit stream. The trellis encoder unit produces a stream of trellis encoded data bits corresponding to bits of the normal and robust bit streams by mapping encoded data bits of the robust packets into symbols according to one or more symbol mapping schemes. The second forward error correction unit reads in only packets of the robust bit stream and enables generation of parity bytes only for the robust packets. The transmitter device transmits the robust bit stream over a communications channel to a receiver device.

31 Claims, 9 Drawing Sheets

DIGITAL TRANSMISSION SYSTEM FOR AN ENHANCED ATSC 8-VSB SYSTEM

CROSS-REFERENCE TO RELATED APPLICATION

The present invention claims the benefit of commonly-owned, co-pending U.S. Provisional Patent Application Ser. No. 60/324,482 filed Sep. 24, 2001. This patent application is additionally related to commonly-owned, co-pending U.S. Provisional Patent Application Ser. No. 60/280,782 filed Apr. 2, 2001 entitled IMPROVED ATSC DIGITAL TELEVISION SYSTEM and commonly-owned, co-pending U.S. Provisional Patent Application Ser. No. 60/295,616filed Jun. 4, 2001, the entire contents and disclosures of each of which are incorporated by reference as if fully set forth herein.

BACKGROUND OF THE INVENTION

1. Field of the Invention

The present invention relates to digital signal transmission systems and particularly, to the Advanced Television Systems Committee (ATSC) Digital Television (DTV) standard (A/53). The invention describes a method for transmitting a robust bit-stream along with the standard bit-stream using the ATSC standard in a backward compatible manner.

2. Discussion of the Prior Art

The ATSC standard for high-definition television (HDTV) transmission over terrestrial broadcast channels uses a signal that comprises a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is broadcast at a data rate of 19.39 million bits per second (Mbps). Details regarding the (ATSC) Digital Television Standard and the latest revision A/53 is available at http://www.atsc.org/.

Figure 1:
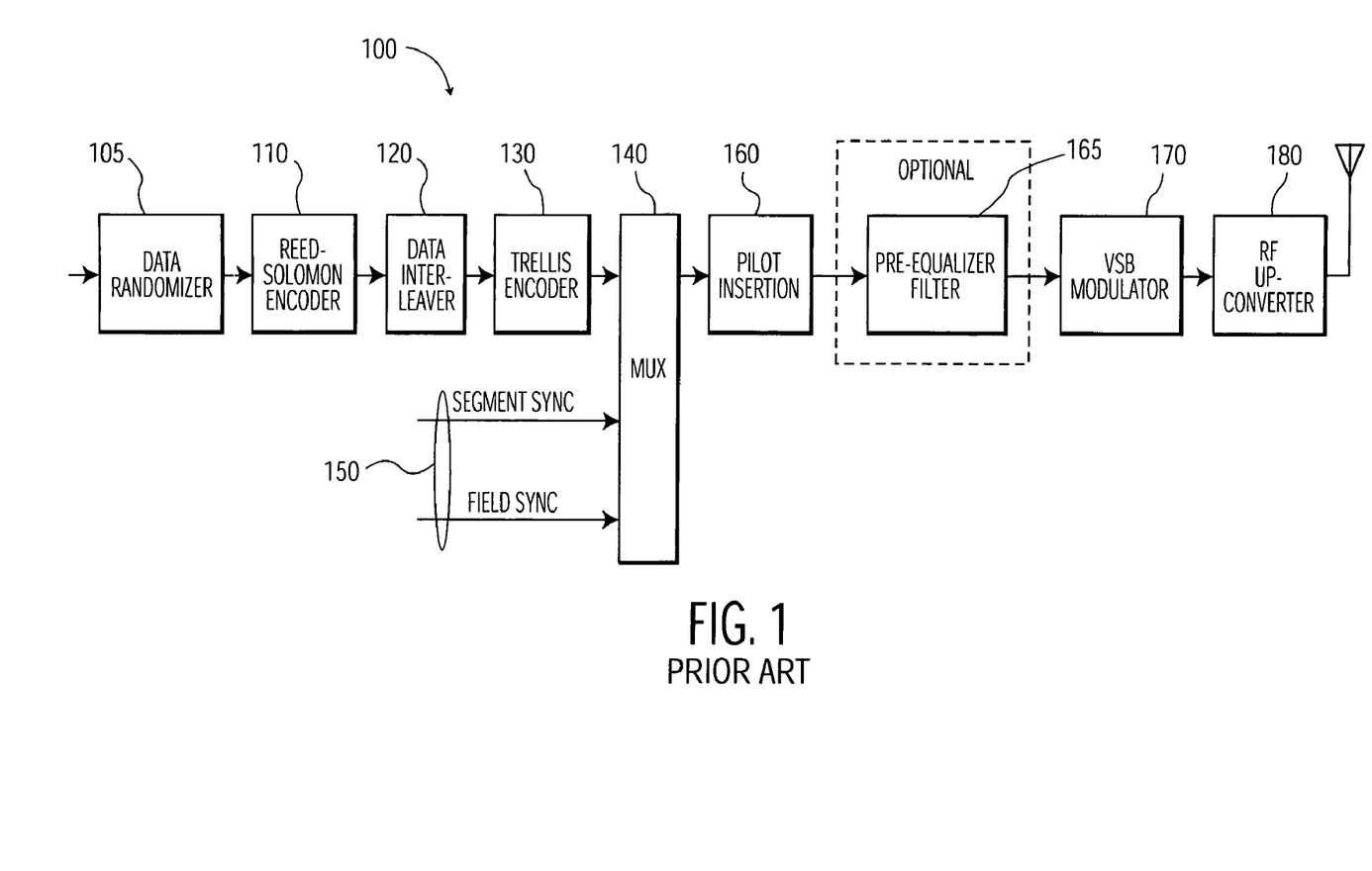
FIG. 1 illustrates a block diagram of an exemplary high definition television (HDTV) transmitter according to the prior art.

FIG. 1 is a block diagram generally illustrating an exemplary prior art high definition television (HDTV) transmitter 100. MPEG compatible data packets are first randomized in a data randomizer 105 and each packet is encoded for forward error correction (FEC) by a Reed Solomon (RS) encoder unit 110. The data packets in successive segments of each data field are then interleaved by data interleaver 120, and the interleaved data packets are then further interleaved and encoded by trellis encoder unit 130. Trellis encoder unit 130 produces a stream of data symbols having three (3) bits each. One of the three bits is pre-coded and the other two bits are produced by a four (4) state trellis encoder. The three (3) bits are then mapped to an 8-level symbol.

As known, a prior art trellis encoder unit 130 comprises twelve (12) parallel trellis encoder and pre-coder units to provide twelve interleaved coded data sequences. In multiplexer 140 the symbols of each trellis encoder unit are combined with "segment sync" and "field sync" synchronization bit sequences 150 from a synchronization unit (not shown). A small in-phase pilot signal is then inserted by pilot insertion unit 160 and optionally pre-equalized by filter device 165. The symbol stream is then subjected to vestigial sideband (VSB) suppressed carrier modulation by VSB modulator 170. The symbol stream is then finally up-converted to a radio frequency by radio frequency (RF) converter 180.

Figure 2:
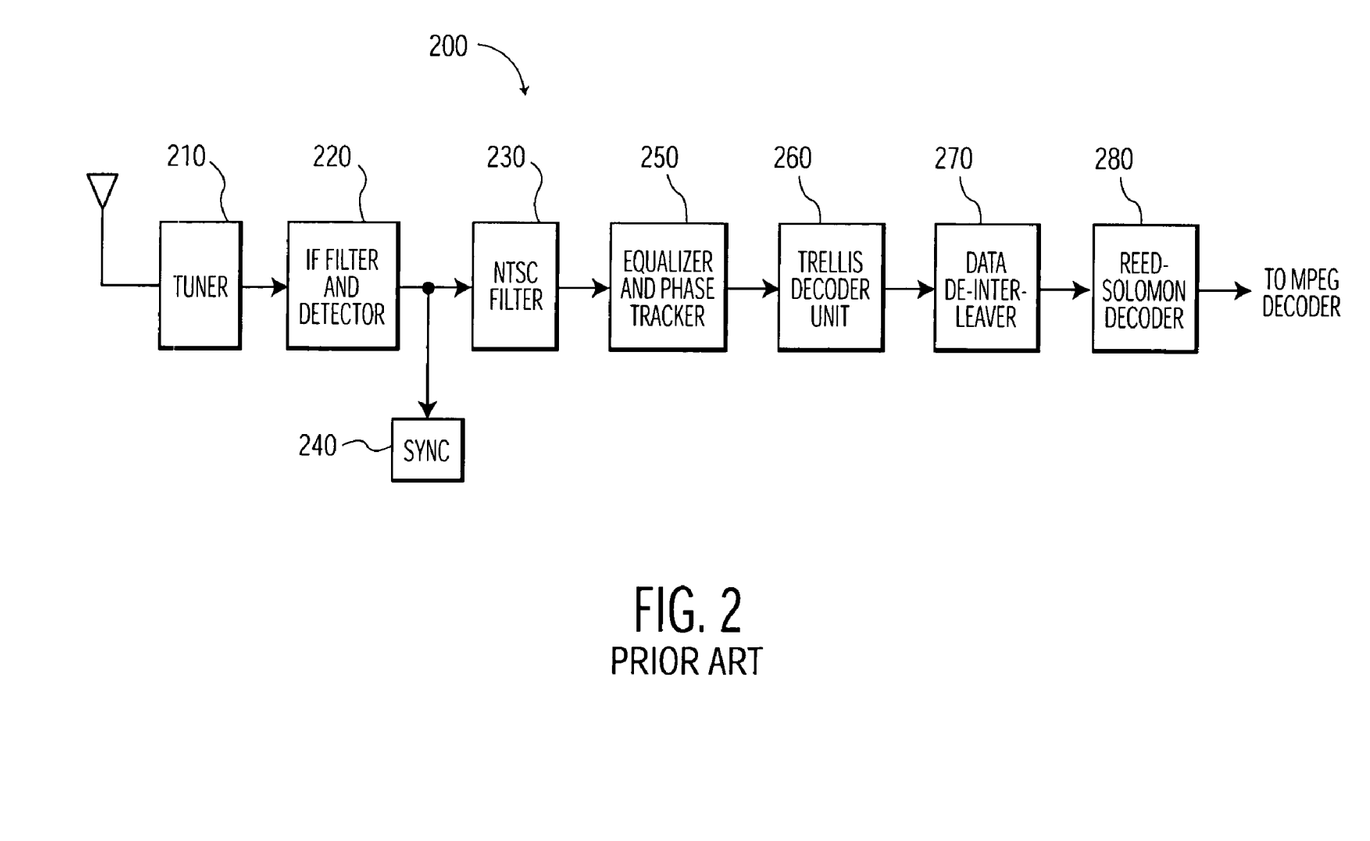
FIG. 2 illustrates a block diagram of an exemplary high definition television (HDTV) receiver according to the prior art.

FIG. 2 is a block diagram illustrating an exemplary prior art high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then provided to NTSC rejection filter 230 and to synchronization unit 240. Then the signal is filtered in NTSC rejection filter 230 and subjected to equalization and phase tracking by equalizer and phase tracker 250. The recovered encoded data symbols are then subjected to trellis decoding by trellis decoder unit 260. The decoded data symbols are then further de-interleaved by data de-interleaver 270. The data symbols are then subjected to Reed Solomon decoding by Reed Solomon decoder 280. This recovers the MPEG compatible data packets transmitted by transmitter 100.

While the existing ATSC 8-VSB A/53 digital television standard is sufficiently capable of transmitting signals that overcome numerous channel impairments such as ghosts, noise bursts, signal fades and interferences in a terrestrial setting, there exists a need for flexibility in the ATSC standard so that streams of varying priority and data rates may be accommodated.

SUMMARY OF THE INVENTION

It is thus an object of the present invention to provide in an ATSC digital transmission system, a technique for transmitting a new robust bit-streams along with the standard ATSC bit-stream, wherein the new bit-stream has a lower Threshold of Visibility (TOV) compared to the ATSC stream, and consequently can be used for transmitting high priority information bits.

It is a further object of the present invention to provide a flexible ATSC digital transmission system and methodology that is backward compatible with existing digital receiver devices.

It is another object of the present invention to provide a flexible ATSC digital transmission system and methodology that provides a parity-byte generator mechanism for enabling backwards compatibility with the existing receiver devices.

In accordance with the preferred embodiments of the invention, there is provided a digital transmission system and method that improves upon the ATSC A/53 HDTV signal transmission standard and includes:

a first forward error correction (FEC) encoding unit for formatting packets belonging to each of robust and normal data bit streams;

a robust processor unit for receiving robust packets comprising priority data and processing the packets for generating the robust bit stream;

a trellis encoder unit for producing a stream of trellis encoded data bits corresponding to bits of the normal and robust streams, the encoder employing mapping of encoded data bits of said robust packets into symbols according to one or more symbol mapping schemes; and, an optional second forward error correction (FEC) encoding unit for ensuring backward compatibility with a receiver device by reading in only packets of the robust bit stream and enabling generation of parity bytes only for the robust stream packets; and, a transmitter device for transmitting the robust bit streams in a backwards compatible manner, separately or in conjunction with said normal bit stream over a fixed bandwidth communications channel to a receiver device, wherein an existing receiver device is capable of receiving and processing packets of the robust bit stream.

To insure backward compatibility with existing receivers from various manufacturers, an optional non-systematic Reed-Solomon encoder is employed to add the parity bytes to the robust bit-stream packets. The standard 8-VSB bit-stream will be encoded using the ATSC FEC scheme (A/53). Packets transmitted using the new bit-stream will be ignored by the transport layer decoder of the existing receiver.

BRIEF DESCRIPTION OF THE DRAWINGS

Details of the invention disclosed herein shall be described below, with the aid of the figures listed below, in which.

DETAILED DESCRIPTION OF THE PREFERRED EMBODIMENTS

A new approach for the ATSC digital transmission system standard comprising the means and methodology for transmitting a new "robust" bit-stream along with the standard ATSC (8-bit) bit-stream, wherein the new bit-stream has a lower Threshold of Visibility (TOV) compared to the standard 8-VSB ATSC stream, and consequently can be used for transmitting high priority information bits, is described in co-assigned, co-pending U.S. patent application Ser. No. 10/078,933 entitled IMPROVED ATSC DIGITAL TELEVISION SYSTEM, the whole contents and disclosure of which is incorporated by reference as if fully set forth herein.

Most notably, the new features provided with the proposed ATSC digital transmission system and methodology described in herein incorporated co-pending U.S. patent application Ser. No. 10/078,933, include the mechanism for enabling a trade-off of the standard bit-stream's data rate for the new bit-stream's robustness which will enable new receiver devices to decode robust packets without errors even under severe static and dynamic multi-path interference environments at a reduced CNR and reduced TOV, and further, a mechanism that enables backward compatible transmission with existing digital receiver devices. The system described particularly improves upon the current ATSC digital transmission system standard by enabling flexible transmission rates for Robust and Standard streams for accommodating a large range of carrier-to-noise ratios and channel conditions.

Figure 3:
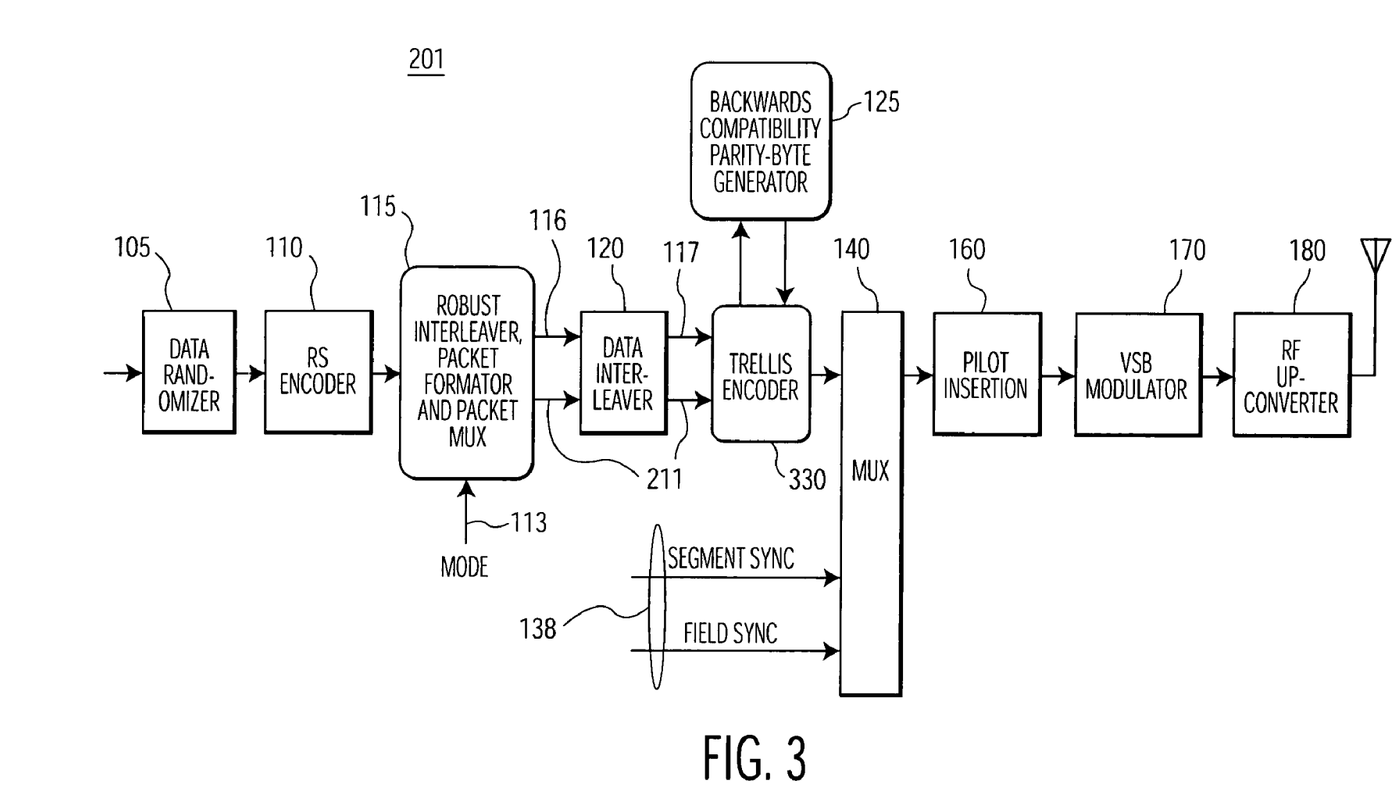
FIG. 3 is a top-level diagram of a first embodiment 201 of the improved ATSC standard according to the present invention.

FIG. 3 is a top-level diagram of a first embodiment 201 of the improved ATSC standard according to the present invention. As shown in FIG. 3, the improved ATSC digital signal transmission standard according to a first embodiment includes the data randomizer element 105 for first changing the input data byte value according to a known pattern of pseudo-random number generation. According to the ATSC standard, for example, the data randomizer XORs all the incoming data bytes with a 16-bit maximum length pseudo random binary sequence (PRBS) which is initialized at the beginning of a data field. The output randomized data is then input to the Reed Solomon (RS) encoder element 110 which operates on a data block size of 187 bytes, and adds twenty (20) RS parity bytes for error correction to result in a RS block size total of 207 bytes transmitted per data segment. It is these bytes that will then be post processed and sent using robust constellations. After the RS encoding, the 207 byte data segment is then input to a new block 115 comprising a robust interleaver, packet formatter and packet multiplexor elements for further processing/reformatting the robust input bytes. Details regarding the operation of the individual elements of the packet formatter block are described in greater detail in herein incorporated co-pending U.S. patent application Ser. No. 10/078,933 and, in commonly owned, co-pending U.S. patent application Ser. No. 10/118,876 entitled PACKET IDENTIFICATION MECHANISM AT THE TRANSMITTER AND RECEIVER FOR AN ENHANCED ATSC 8-VSB SYSTEM, the whole contents and disclosure of which is incorporated by reference as if fully set forth herein. Most generally, the robust interleaver, packet formatter and packet multiplexor elements for reformatting incoming bytes are responsive to a mode signal 113 which indicates whether the incoming byte is processed (for robust bytes) or not (for normal bytes). After interleaving robust packets in the robust interleaver, the data bytes belonging to the incoming robust bit-stream are buffered and grouped in the packet formatter device into groups of a pre-defined number of bytes, e.g., 207 bytes. In general, for robust packets, only 4 bits of each byte at the packet formatter output, the LSBs (6,4,2,0), correspond to the incoming stream. The other 4 bits of each byte, the MSBs (7,5,3,1), may be set to any value for reasons as will be explained in greater detail herein. After byte re-formatting in the packet formatter 115, the bytes belonging to robust packets are multiplexed with the bytes belonging to the standard stream. The multiplexed stream 116 of robust and standard bytes are next input to the convolutional interleaver mechanism 120 where data packets in successive segments of each data field are further interleaved for scrambling the sequential order of the data stream according to the ATSC A/53 standard. As will be explained in greater detail, bytes associated with each robust packet or standard packet is tracked in concurrent processing control blocks (not shown). As further shown in FIG. 3, the interleaved, RS-encoded and formatted data bytes 117 are then trellis coded by a novel trellis encoder device 330. Trellis encoder unit 330 is particularly responsive to the mode signal 113 and cooperatively interacts with a backwards compatibility parity-byte generator element 125, herein referred to as a backward compatibility (optional RS encoder) block 125 in the manner as will be explained in greater detail herein, to produce an output trellis encoded output stream of data symbols having three (3) bits each mapped to an 8-level symbol. The trellis encoded output symbols are then transmitted to multiplexor unit 140 where they are combined with the "segment sync" and "field sync" synchronization bit sequences 138 from a synchronization unit (not shown). A pilot signal is then inserted by the pilot insertion unit 160. The symbol stream is then subjected to vestigial sideband (VSB) suppressed carrier modulation by VSB modulator 170 and the symbol stream is then finally up-converted to a radio frequency by the radio frequency (RF) converter 180.

Figure 4:
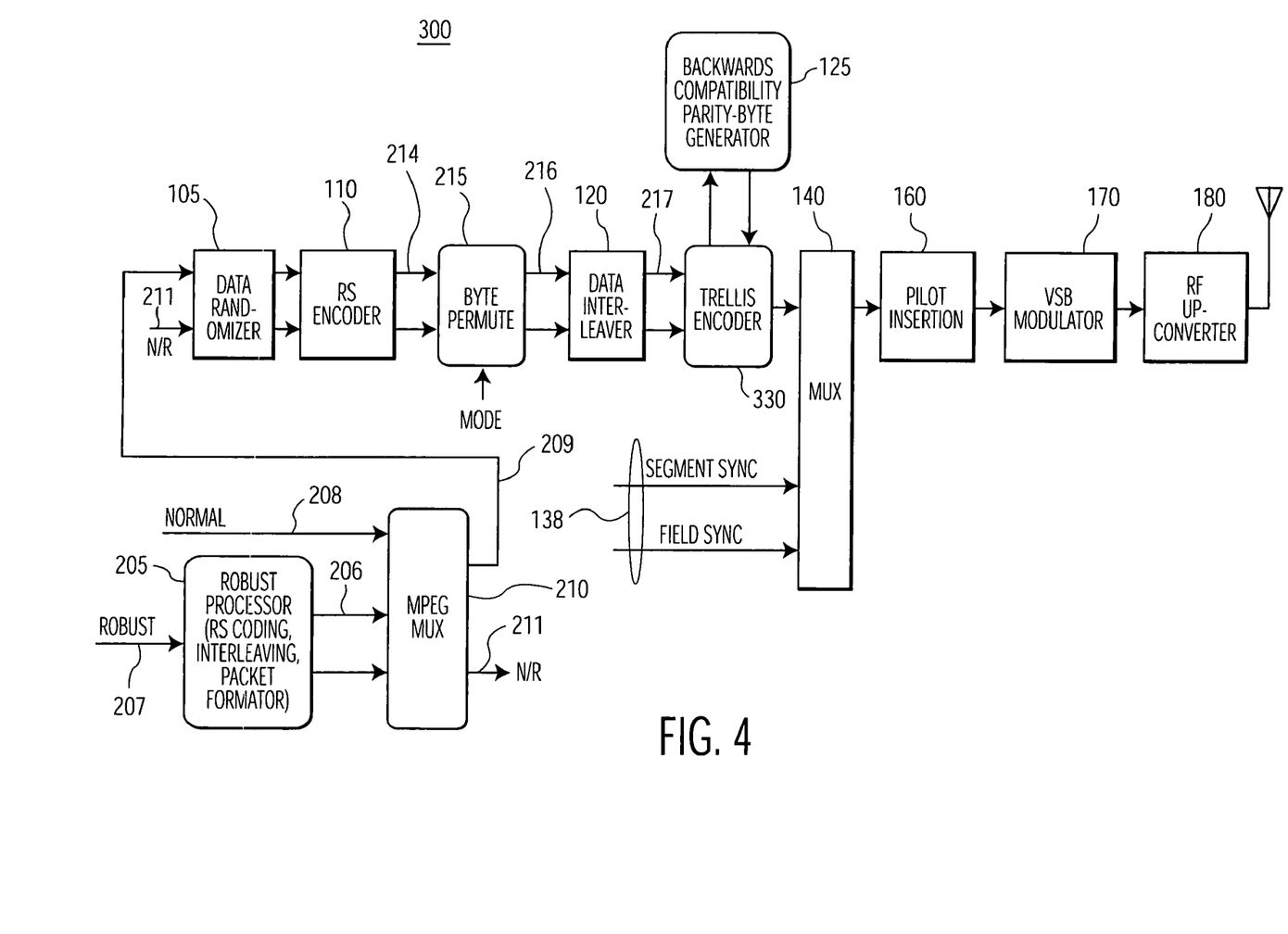
FIG. 4 is a top-level diagram of a second embodiment 300 of the improved ATSC standard according to the present invention.

FIG. 4 is a top-level diagram of a second embodiment 300 of the improved ATSC standard according to the present invention. As shown in FIG. 4, the improved ATSC digital television transmission standard according to the second embodiment includes identical functioning blocks as the first embodiment depicted in FIG. 3, however, the front end of the system 300 of FIG. 4 comprises new blocks including a Robust processor element 205 for processing bytes belonging to a robust packets received from an input robust bit stream 207 and forwarding them into an MPEG multiplexor unit 210, which additionally receives bytes belonging to a normal (standard) bit stream 208. The multiplexor unit 210 multiplexes robust and standard packets for input to the standard data randomizer element 105 that changes the input data byte values according to pseudo-random generated patterns, for instance. The output randomized data are then input to the Reed Solomon (RS) encoder element 110 which operates on a data block size of 187 bytes, for instance, and adds twenty (20) RS parity bytes for error correction to result in a RS block size total of 207 bytes transmitted per data segment. After the RS encoding, the 207 byte data segments 214 are then input to an optional byte permute block 215 which further processes only the packets of a robust bit stream and passes the normal packets unaltered. This byte permute block 215 functions to replace the parity bytes added by the preceding RS encoder block 110 with zeroes, and permutes the 207 byte such that after the data interleaver, the 184 data bytes created by the robust processor (excluding the header bytes) will come before the parity bytes. As shown in FIG. 4, the new byte permute block 215 is particularly responsive to the mode signal 113 which indicates whether the incoming bytes will be processed by this block or not. As in the first approach described with respect to FIG. 3, data segments of robust and standard bytes 216 output from the byte permute block 215 are next input to the convolutional interleaver mechanism 120 where data packets in successive segments of each data field are further interleaved for scrambling the sequential order of the data stream according to the ATSC A/53 standard. As further shown in FIG. 4, the interleaved, RS-encoded and formatted data bytes 217 are then trellis coded by a novel trellis encoder device 330. As described in greater detail herein, the trellis encoder unit 330 cooperatively interacts with a backwards compatibility (optional RS encoder) block 125, to produce an output trellis encoded output stream of data symbols having three (3) bits each mapped to an 8-level symbol. The trellis encoded output symbols are then transmitted to multiplexor unit 140 where they are combined with the "segment sync" and "field sync" synchronization bit sequences 138 from a synchronization unit (not shown). The pilot signal is then inserted by the pilot insertion unit 160, the symbol stream is then subjected to vestigial sideband (VSB) suppressed carrier modulation by VSB modulator 170 and, the symbol stream is up-converted to a radio frequency by the radio frequency (RF) converter 180.

As shown in FIG. 4, the Robust processor element 205 includes an input for receiving the MPEG data packets 207 to be communicated as a robust stream. This robust processor block 205 includes the following components: a Reed-Solomon encoder, followed by an interleaver device, and, followed with a formatter block to form 188-byte length packets (MPEG compatible packets). The last block (MPEG packet formation) inserts redundancy bits to form a 184-byte packet, then adds four (4) MPEG header bytes to form a complete 188 MPEG packet. The robust packets 206 out of the processor block 205 are multiplexed with normal packets of the MPEG packet stream 208 for transmission as an ATSC stream 209 comprising both normal and robust packets, via MPEG multiplexer device 210. Preferably, the normal stream packets are multiplexed with the robust packets according to a pre-defined algorithm, an exemplary algorithm of which will be described in greater detail herein. For purposes of discussion, and, as explained in greater detail in commonly-owned, co-pending U.S. patent application Ser. No. 10/118,876, the contents and disclosure of which is incorporated by reference as if fully set forth herein, a control mechanism is provided for tracking the type of packets transmitted, i.e., normal or robust. Thus, as shown in FIG. 3 and 4, associated with each byte there is generated a normal/robust ("N/R") signal which comprises a bit 211 used to track the progression of the bytes and identify the bytes in the enhanced ATSC digital signal transmission scheme.

Generally, for the embodiment of the ATSC system described with respect to FIG. 4, transmission of robust packets requires knowledge of the manner by which the robust packets 206 are multiplexed with the normal packets 208 at the MPEG multiplexer element 210. The packets need to be inserted in such a manner that they improve the dynamic and static multipath performance of a receiver device. One exemplary algorithm governing the multiplexing of robust stream packets with the normal stream packets in the robust processor block 205 of FIG. 4, is now described with respect to the Table 1. The packet insertion algorithm is enabled to exploit the robust packets to enable better and robust receiver design.

At the beginning of an MPEG field, a group of robust packets is placed contiguously, then the rest the packets are inserted using a predetermined algorithm, as now described with respect to Table 1. The first group of packets will help the equalizer in faster acquisition in both static and dynamic channels. This robust packet insertion algorithm is implemented before interleaving for every field. With respect to the example robust packet insertion algorithm of Table 1, the following quantities and terms are first defined: a first quantity referred to as "NRP" represents the number of robust segments occupied by robust packets per field (i.e., indicates the Number of Robust Packets in a frame); the quantity referred to as "M" is the number of contiguous packet positions occupied by robust bit-stream immediately following the field sync; the character "U" represents the union of two sets; and, "floor" represents the truncation of a decimal so that values are rounded to an integer value. As shown in Table 1, the algorithm comprises performing the following evaluations to determine the placement of the robust packet in the bit stream:

TABLE 1

If 0 < NRP ≤ M, then
   robust packet position = {0, 1, ..., NRP-1}
If M < NRP ≤ floor((312-M)/4)+M, then
   robust packet position = {0, 1, ..., M-1} U
      {M+4i, i = 0, 1, ..., (NRP - M-1) }
If floor((312-M)/4)+M < NRP ≤ floor((312-M-2)/4)+floor((312-M)/4)+M, then
   robust packet number = {0, 1, ..., M-1} U {M+4i,
      i = 0, 1, ..., floor((312-M)/4) −
      1}   U {M+2+4i, i = 0, 1, ..., NRP
      − (floor((312-M)/4)+M) − 1}
If floor((312-M-2)/4)+floor((312-M)/4)+M < NRP ≤
312, then
   robust packet number = { 0, 1, ..., M-1} U
      {M+4i, i = 0, 1, ..., floor((312-
      M)/4) −1} U {M+2+4i, i = 0, 1,
      ..., floor((312-M-2)/4)-1} U
      {M+1+2i, i = 0, 1, ..., NRP − (M+
      floor((312-M)/4) + floor((312-M-
      2)/4))-1}

Thus, in an example implementation for the case when M=18, the above algorithm results in the following algorithm for robust packet placement:

If 0<NRP≤18, then robust packet position={0, 1, . . . , NRP-1}

If 18<NRP≤91, then robust packet position={0, 1, . . . , 17}U{18+4i,i=0, 1, . . . , (NRP-19)};

If 91<NRP≤164, then robust packet position={0, 1, . . . , 17}U {18+4i, i=0, 1, . . . , 72} U {20+4i,i=0, 1, . . . , NRP-92}

If 164<NRP≤312, then robust packet position={0, 1, . . . , 17} U {18+4 i, i=0, 1, . . . , 72} U {20+4i,i=0, 1, . . . , 72} U {19+2i, i=0, 1, . . . , NRP-165}

In each of the first and second embodiments of FIGS. 3 and 4, a backward compatibility Parity Byte Generator element 125 (additionally referred to as the optional non-systematic RS encoder) is provided to read bytes from the trellis decoder. Particularly, this block 125 comprises a byte de-interleaver block and an optional "non-systematic" RS encoder block for reading in a packet from the byte de-interleaver block and then RS encoding it to generate the parity bytes. It generates the parity bytes only for robust stream packets used for backward compatibility. An exemplary algorithm used to perform this function is now provided with respect to Table 2:

TABLE 2

1. Define an array 'data_bytes' of size 52 × 207,
2. Initialize the variables 'byte_no', 'row_no', 'col_no', 'row_add' to zero,
3. If byte_no = 207*52 then set the 'read_flag' and 'start_flag' to 1,
4. If start_flag = 1 then set read_flag = 1 every 208 bytes (see packet_formatter block description for exceptions to this rule),
5. If start_flag = 1 then read out a packet in order whenever read_flag is set beginning with packet 0 (row_no = 0),
6. Place the message byte (output of trellis encoder) in data_bytes [row_no] [col_no]
7. Increment byte_no if 'byte_stb' (signal from the trellis encoder) = 1,
8. Update 'row_no' and 'col_no' variables using the following conditional logic
   a) If byte_no = 207*52 then
      byte_no = 0;

TABLE 2-continued row_add = 0;
      col_no = 0;
      row_no = 0;
   b) Else if (byte_no mod 208) = 0 then
      row_add = (row_add+1) mod 52;
      col_no = row_add;
      row_no = row_add;
   c) For all other cases
      col_no = (col_no+52) mod 207;
      row_no = (row_no-1) mod 52; (if row_no-1 < 0
      then add 52 to the result)
9. Go to step 3

For some packets (e.g., 1 to 7 mod 52), it will be necessary to have prior information about the randomized header bytes, since not all the header bytes for these packets will be available at the time of RS encoding. That is, for this set of packets, it is the case that some of the header bytes follow the parity bytes at the convolutional interleaver output. Therefore, instead of waiting for these header bytes to calculate the 20 parity bytes, prior information about the header bytes is used (they are deterministic) which are then used instead to calculate the parity bytes.

As explained in the book "Error Control Techniques for Digital Communication", 1984, John Wiley, N.Y. by Arnold Michelson & Allen Levesque, an (N, K) RS decoder can correct up to (N−K)/2 errors or erasure fill up to (N−K) erasures, where "N" is code word length and "K" is message word length. In general, if there are $E_a$ erasures and $E_b$ errors in a code word of length N, then the decoder can completely recover the code word as long as $(E_a+2*E_b)$ is less than or equal to (N−K) as set forth in equation (1) as follows:

$$(E_a+2 \times E_b) \leq (N-K) \quad (1)$$

where $E_a$ and $E_b$ are the number of erasures and number of errors in the code word respectively;.

This property of RS codes may be used to generate the 20 parity bytes. The 20 parity byte locations are then calculated for use as the erasures' location for the RS decoder. The procedure for the calculation of the parity byte locations is similar to the one used in the packet formatter. The bytes belonging to a packet (with zeroes in parity byte locations) are passed on to the RS decoder as the input code word. The decoder, in the process of erasure filling, calculates the bytes for the erasure locations. These bytes correspond to the 20 parity bytes. Thus, the Parity byte Generator block also generates the parity byte location information. The parity bytes and the header bytes are always encoded as standard 8-VSB symbols.

The parity bytes and their location information for each packet are then sent to a modified trellis encoder device for mapping robust bytes according to new symbol mapping schemes. It should be understood that, for some packets (e.g., packets 1 to 7), it is necessary to have prior information about the randomized header bytes, since all the header bytes for these packets will not be available at the time of RS encoding.

The top-level operation of the modified trellis encoder is governed by the rule described in section 4.2.5 of the ATSC A/53transmission standard. This top-level operation is related to trellis interleaving, symbol mapping, the manner in which bytes are read into each trellis encoder, etc. Trellis encoding of the normal 8-VSB packets is not altered. However, the trellis encoder block according to the ATSC A/53standard is modified in order to perform functions of: 1)

by-passing the pre-coder if the bytes belong to the robust bit-stream; 2) deriving each MSB bit if the byte belongs to the robust stream and then sending the new byte to the 'byte de-interleaver' block; 3) reading the parity bytes from 'byte de-interleaver' block and using them (if they belong to robust stream) for encoding; and 4) utilizing modified mapping schemes to map symbols belonging to the robust bit-stream. It should be understood that, preferably, parity bytes are mapped onto eight (8) levels.

With regard to the functions of bypassing the pre-coder and forming the byte, this process is mode dependent as will now be described with respect to modified trellis encoder diagrams of FIGS. 5 and 6.

Figure 5:
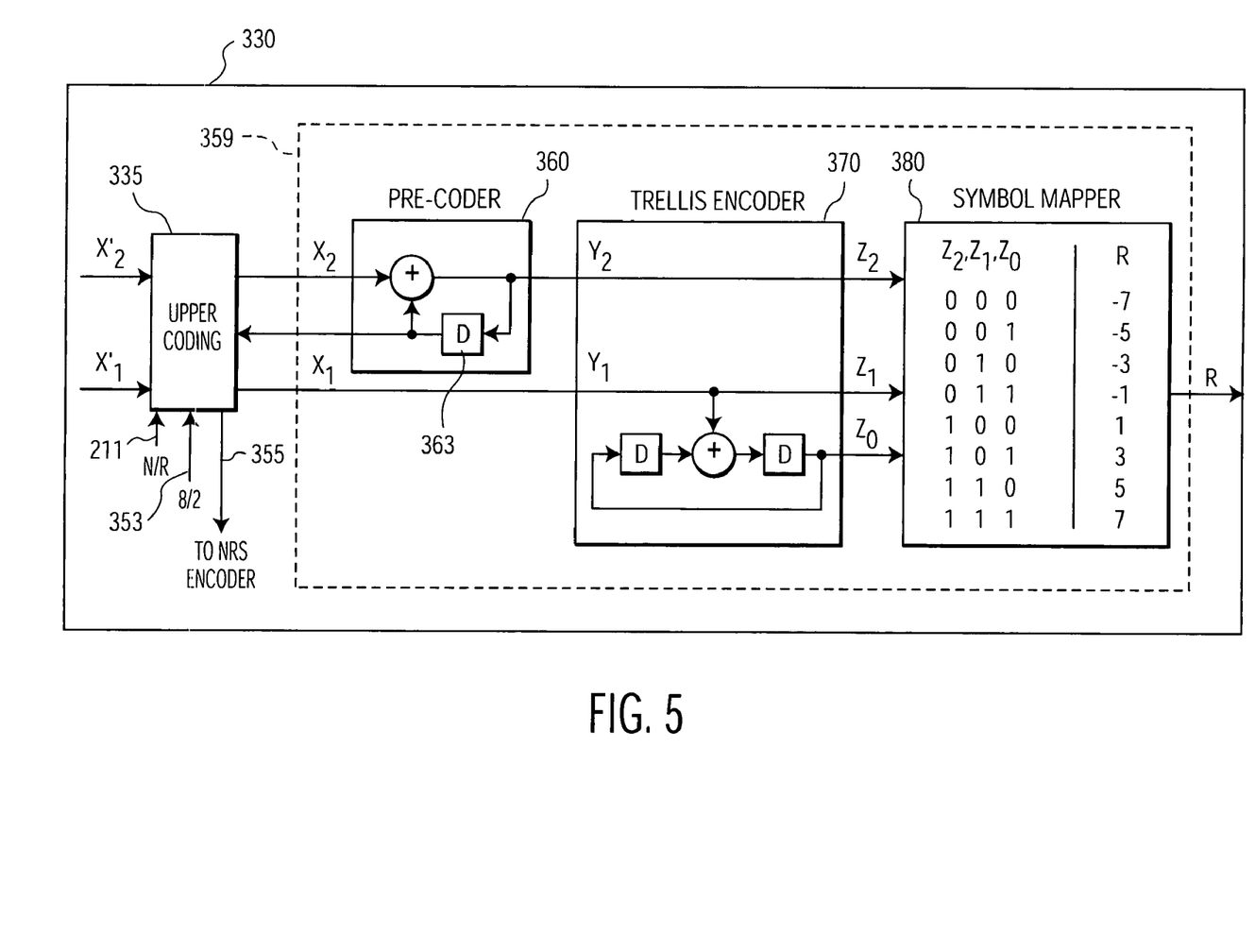
FIG. 5 is a block diagram illustrating a trellis encoding scheme 330 implemented in the transmission systems of FIGS. 3 and 4.

Particularly, FIG. 5 is a block diagram illustrating a trellis encoding scheme 330 implemented in the transmission systems of FIGS. 3 and 4. For enhanced 8-VSB (E-VSB), or 2-VSB streams, each trellis encoder receives a byte, of which only 4-bits (LSBs) comprise information bits. When a byte that belongs to the robust stream is received by the trellis encoder, the information bits (LSBs, bits (6,4,2,0)), (after encoding for robust modes) are placed on $X_1$. The bit to be placed on $X_2$ to obtain the particular symbol mapping scheme is then determined. Once $X_2$ and $X_1$ are determined, all the bits of a byte are then determined for the purpose of subsequent "non-systematic" RS encoding. This byte is then passed to the backwards compatibility parity-byte generator 125 (i.e., the "non-systematic" Reed-Solomon encoder) via datalines 355. The parity bytes of the "non-systematic" Reed-Solomon encoder and PID bytes will however be encoded using the 8-VSB encoding scheme. The operation in the upper trellis encoding block 335 of the trellis encoder 330 for each of the digital signal modulation modes is now described with respect to FIG. 6.

Figure 6:
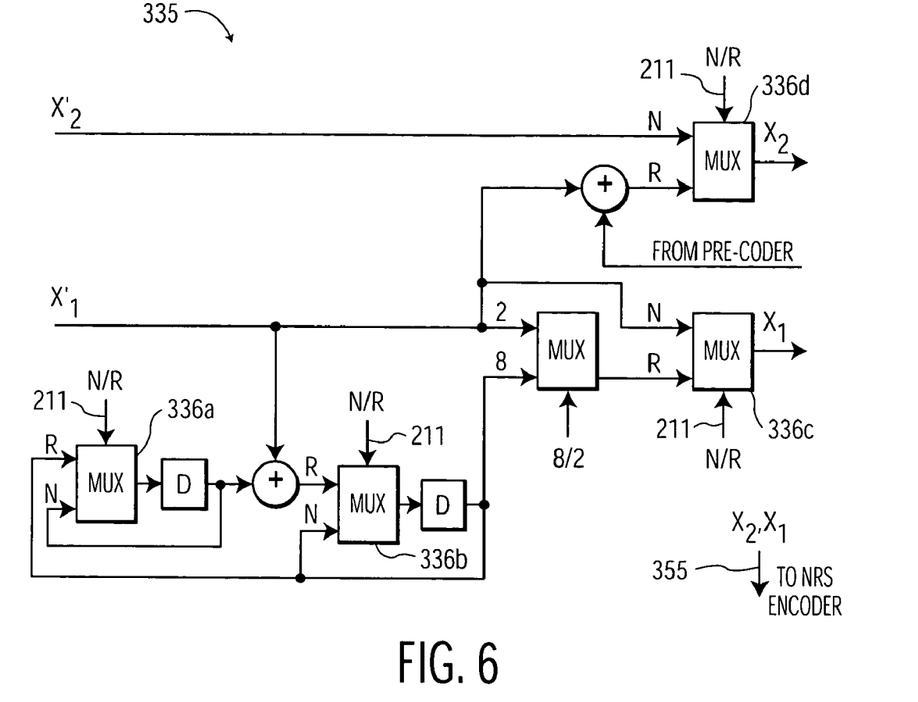
FIG. 6 is a simplified block diagram illustrating the outer coding circuit 335 of the modified trellis encoder 330 according to the invention.

The upper trellis encoding block 335 shown in FIG. 6 calculates the pre-coder 360 inputs, $X_2$ and $X_1$, of the standard trellis encoder block 359, so that the desired symbol mapping or encoding scheme is achieved. For example, these encoding schemes are for the standard 8-VSB, (enhanced) E-VSB and 2-VSB and the "8/2" control bits 353 are provided for indicating the correct encoding (symbol mapping scheme). The output bits of this block are grouped into their respective bytes, and eventually fed into the "non-systematic" RS encoder block for parity byte generation. The Normal/Robust control bits 211 needed to configure the multiplexers 336a, . . . , 336d in FIG. 6 are provided by the tracking/control mechanism blocks in respective FIGS. 3 and 4.

Thus, for the Normal (standard) 8-VSB symbol mapping mode, the input bits $X'_2$ and $X'_1$ received from the previous interleaver block and input to the upper coder 335 of trellis encoder 330 are passed unaltered to the normal trellis encoder comprising pre-coder 360 and encoder 370 units. This is achieved by making the N/R bit 211 select the N input of the multiplexers. The 8/2 bit 353 is a further control bit indicating the trellis mapping scheme to be employed when N/R bit is R (robust).

For the 2-VSB mode and 4-VSB symbol mapping modes, the MSB does not carry any information. To satisfy mapping requirements, the $Z_2$ bit is calculated first and then modulo-2 summed with pre-coder memory content 363 (FIG. 5) to derive the MSB $X_2$. A new byte is formed from the calculated MSB and the input information bit $X_1$. The memory element is then updated with $Z_2$. Thus, in this case, the trellis encoder outputs $Z_2$ and $Z_1$ are made equal to the information bit. That is, input $X_2$ is calculated such that, when pre-coded, the output of the pre-coder $Z_2$ equals the information bit. This operation is implemented in the upper coding circuit 335 illustrated in FIG. 6. In addition, $X_1$ is made equal to the information bit. These operations, combined with the existing symbol mapping scheme enabled by trellis encode symbol mapper 380, result in symbols from the alphabet {−7, −5,5,7}. This is essentially a 2-VSB signal in the sense that the information bit is transmitted as the sign of this symbol. The actual symbol is a valid trellis coded 4-level symbol capable of being decoded by existing trellis decoders. For example, to achieve 2-VSB encoding, N/R bit 211 is set to select the R input and the 8/2 switch 353 is set to select the '2' input of the multiplexers 336a, . . . , 336d.

For the Enhanced 8-VSB mode (E-VSB) mode, $X_2$ and $X_1$ correspond to the outputs of the enhanced coder (i.e., upper coder 335). These bits have to be used in forming the bytes instead of the actual inputs. Accordingly, in this mode, $Z_2$ is made equal to the information bit by putting a trellis-coded version of the information bit on $X_1$. In order to do this, $X_2$ is calculated such that, when pre-coded, it results in the information bit. The information bit is also passed through an additional trellis encoder to produce $X_1$. Overall, for E 8-VSB, the outer coder 335 and the normal trellis encoder 359 will be equivalent to a higher state (e.g., 16-state) ⅓ rate trellis encoder. The resulting symbol is an 8-level trellis coded symbol. To achieve Enhanced 8-VSB encoding, the N/R bit 211 is set to select the R input and the 8/2 switch 353 is set to select the "8" input of the multiplexers 336a, . . . , 336d.

In each of these modes, the symbol to byte converter introduces a delay of 12 bytes.

With regard to the function of reading parity bytes from the byte de-interleaver, this is implemented only when NRS=1 (i.e., non-systematic RS encoding is implemented). The behavior of this functional unit is the same for different modes. The trellis encoder 330 obtains the parity bytes and their location information for each packet from the parity byte generator 125. The trellis encoder 330 may then determine if a particular byte that it is going to encode belongs to the set of parity bytes. If the byte belongs to the robust stream parity byte set, then it reads a byte from the byte de-interleaver and uses it instead to trellis encode. The symbols generated from the parity bytes are always mapped into eight (8) levels using the original encoding and mapping scheme.

With more particularity, parity 'place-holders' are inserted by the packet formatter element of the transmission systems of FIGS. 3 and 4.

Figure 7:
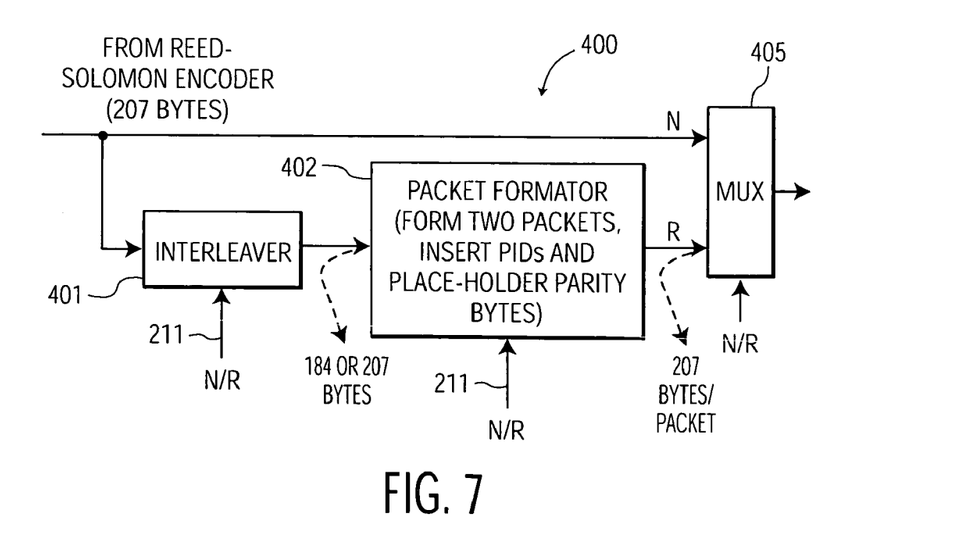
FIG. 7 illustrates in detail the Robust packet interleaver block 400 which is shown including an interleaver 401 and a packet formatter unit 402.

FIG. 7 illustrates in greater detail, the Robust packet processor block 400 which is shown including an interleaver 401, a packet formatter unit 402, and a normal/robust multiplexor (N/R MUX) 405. The robust packet interleaver 401 preferably interleaves only the robust packets. The Packet formatter 402 processes the robust packets according to whether the "non-systematic" RS encoder is used to ensure backward compatibility for legacy receivers. If it is determined that NRS=1, then the "non-systematic" RS encoder is used and the packet formatter 402 reads 184 bytes from the interleaver and splits these bytes into two 184-byte data blocks. In general, only 4 bits of each robust byte, the LSBs (6,4,2,0), correspond to the incoming stream. The other 4 bits of each byte, the MSBs (7,5,3,1), are set to any value. After packet splitting is done, three randomized null packet ID (or 3 NULL PID) bytes are then inserted at the beginning of each of the two 184-byte length data blocks. Then, twenty (20) "place-holder" parity bytes are added to each data block to create a 207-byte packet. In creating the 207 bytes, the 184 bytes including the information stream and the twenty (20) "place-holder" parity bytes are permuted in such a way that after the standard 8-VSB data interleaver, these 20 bytes will appear at the end of the 184 bytes containing the information bits. At this stage, the values of the twenty (20) bytes can be set to zero. This option, incorporated for the purpose of ensuring backward compatibility with legacy receivers, reduces the effective data rate since 23 bytes (20 parity bytes and 3 header bytes) have to be added per packet. The result is about a 12% reduction in payload. If it is determined that NRS=0, then the "non-systematic" RS encoder is not used. In this case, the packet formatter 402 reads 207 bytes from the interleaver and splits these bytes into two 207-byte packets. In general, only 4 bits of each byte, the LSBs (6,4,2,0), correspond to the incoming stream. The other 4 bits of each byte, the MSBs (7,5,3,1), can be set to any value. In both cases, it is understood that the Robust/Normal packet MUX 405 is a packet (207 byte) level multiplexer. It multiplexes the robust and normal packets on a packet-by-packet basis.

The packet formatter's functionality depends on MODE and NRS parameters. If NRS=0, then the packet formatter basically performs the function of byte duplication or byte rearrangement. If NRS=1 then it also inserts 'place holders' for the additional header and parity bytes. Table 3 summarizes the packet formatter functionality for different combinations of the MODE and the NRS parameters.

TABLE 3

| NRS | MODE | Number of input packets | Number of output packets | Functionality |
| --- | --- | --- | --- | --- |
| 0 | 2, 3 | 1 | 2 | Byte duplication |
| 0 | 1 | 2 | 2 | Rearrange bits |
| 1 | 2, 3 | 4 | 9 | Byte duplication, Insert "place holders" |
| 1 | 1 | 8 | 9 | Rearrange bits, Insert "place holders" | where the "MODE" parameter includes specification of the robust packets and is used in identifying the format of the robust packets; and, as mentioned, the "NRS" parameter indicates whether the non-systematic RS coder is not to be used (when NRS=0) resulting in one robust packet being coded into two symbol segments by the FEC block, for example, or, whether the non-systematic RS coder is to be used (when NRS=1) resulting, for example, in a group of four robust packets being coded into nine packet segments by the FEC block. With respect to the MODE parameter, two bits are preferably used to identify four possible modes: e.g., MODE 00 indicating a standard stream with no robust packets to be transmitted; MODE 01 indicating an H-VSB stream; MODE 10 indicating an 4-VSB stream; and MODE 11 indicating a pseudo 2-VSB stream. If MODE=00 then rest of the parameters may be ignored.

Figure 8A:
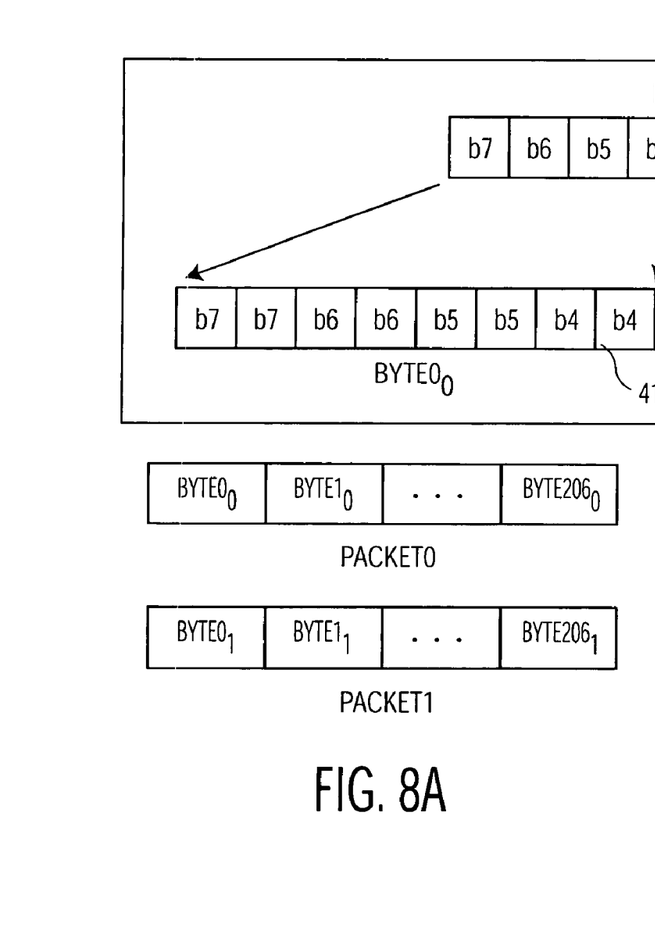
FIGS. 8(a) and 8(b) illustrate the basic formatter function of duplicating the bytes of a packet into two bytes when MODE=2 or 3, and respectively for the case when NRS=0 (FIG. 8(a)) and NRS=1 (FIG. 8(b))
Figure 8B:
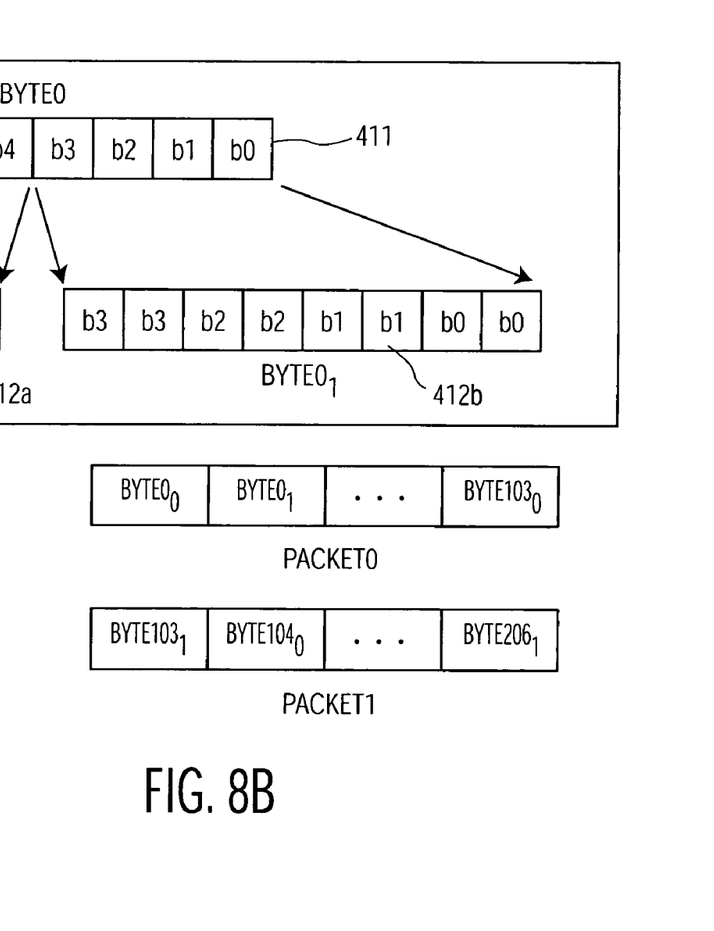
Figure 9A:
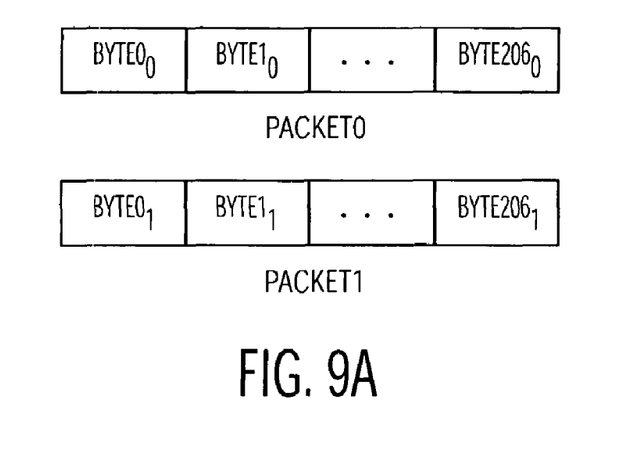
FIGS. 9(a) and 9(b) illustrate the basic formatter function of rearranging the bits of an input packet into two bytes when the MODE=1, and respectively for the case when NRS=0 (FIG. 9(a)) and NRS=1 (FIG. 9(b)); and, FIG. 10 illustrates the parity 'place-holder' insertion mechanism for an example scenario.
Figure 9B:
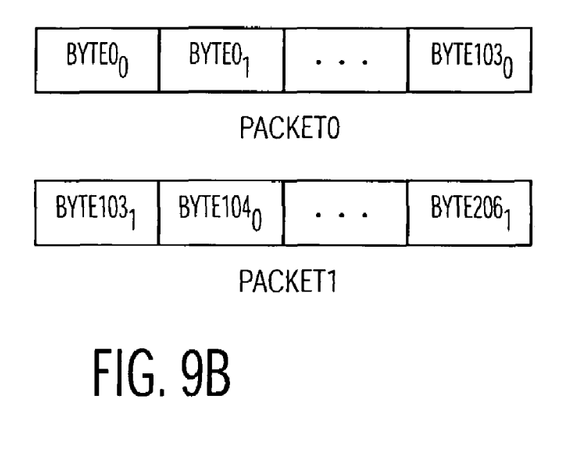

More specifically, the packet formatter block 402 includes three functional units: 1) a basic formatter; 2) a parity byte location calculator; and, 3) a 'place holder' inserter. As shown in FIGS. 8(a) and 8(b), when the MODE=2 or 3, and respectively for the case when NRS=0 (FIG. 8(a)) and NRS=1 (FIG. 8(b)) MODE=2 or 3, the basic formatter duplicates the bytes of a packet 411 into two bytes 412a, 412b. If the MODE=1 as shown in respective FIGS. 9(a) and 9(b) for the respective cases of NRS=0 (FIG. 9(a)) and NRS=1 (FIG. 9(b)), the basic formatter rearranges the bits of an input packet. The rearranging of bits is performed in the H-VSB mode, for example, to ensure that bits 415 belonging to the 'robust stream' always go into MSB bit positions and the bits 417 belonging to the 'embedded stream' always go into LSB bit positions of the reformatted packets 418a, 418b, as shown in FIGS. 9(a) and 9(b).

As mentioned, the packet formatter unit 402 of FIG. 7 includes a parity 'place-holder' inserter function. The parity 'place-holder' inserter block is used only when NRS=1 (i.e., when the additional parity byte generator is used). It specifically transforms eight (8) packets into nine (9) packets by inserting three (3) header bytes and twenty (20) 'place holders' for parity bytes into each of the eight formed packets. The header bytes are always placed in positions 0, 1 and 2 of each packet, and are scrambled. The byte locations corresponding to the parity byte locations may be first filled with zeroes when formed. All the other remaining byte locations may be filled with the message bytes in order.

Figure 10:
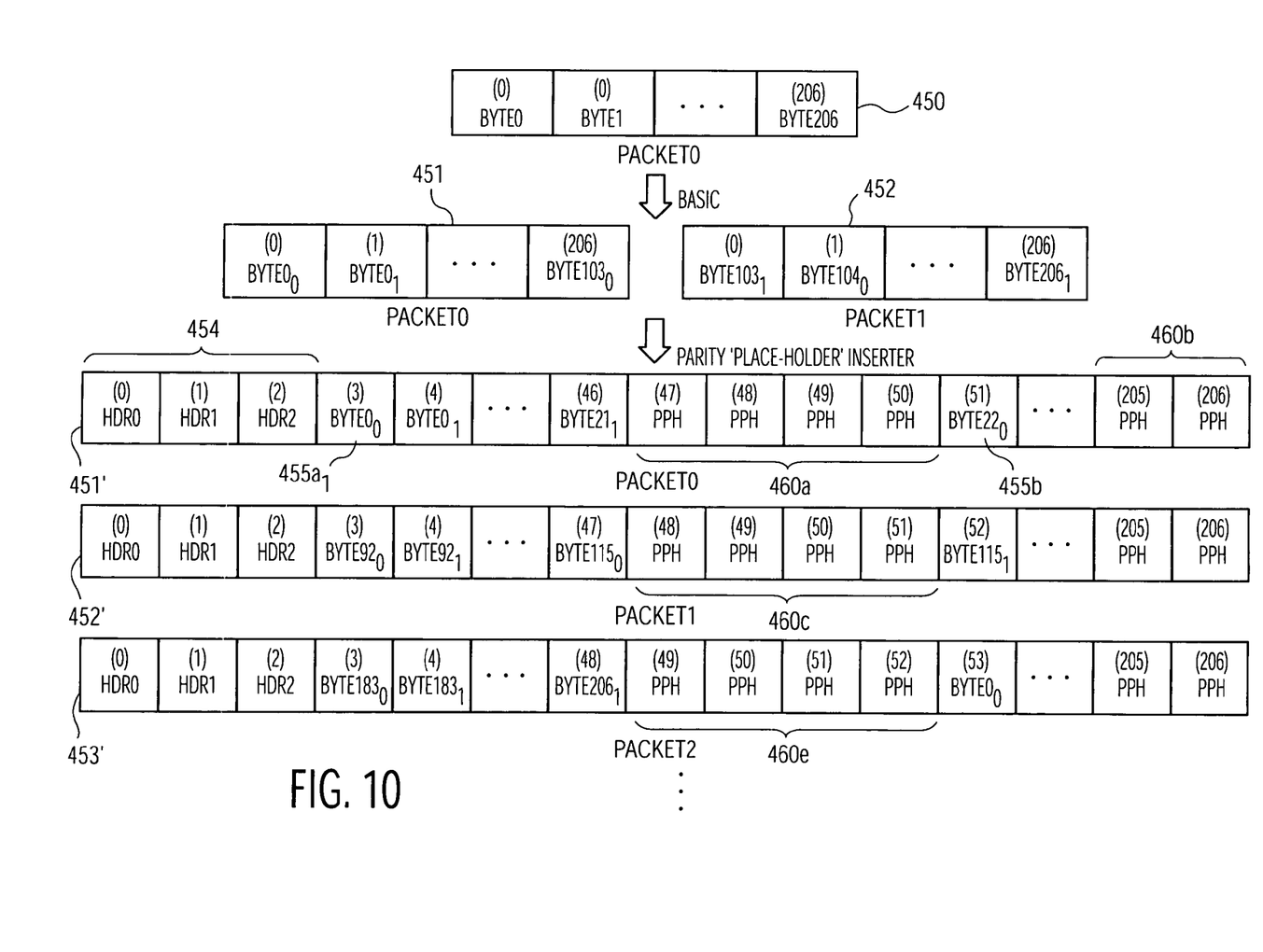

FIG. 10 illustrates the parity 'place-holder' insertion mechanism for an example scenario (NRS=1). The basic formatter converts one data packet 450 of 207 byte into 414 bytes (i.e., equivalent to two (2) packets). The parity byte place holder locations 460a, 460b and 460c for each packet are then determined according to equation 2) as follows:

$$m = (52 * n + (k \bmod 52)) \bmod 207 \quad (2)$$

where m is the output byte number and n is the input byte number, e.g., n=0 to 206, and k=0 to 311 corresponds to the packet number. To ensure that the location of the 20 parity bytes for each packet always correspond to the last 20 bytes of that packet, the 'm' values for parity byte locations may be computed for n=187 to 206 only (these values of n correspond to the last 20 bytes of a packet). As an example, substituting k=0 and n=187 to 206 will give parity byte locations for packet 0 as 202, 47, 99, 151, 203, 48, 100, 152, 204, 49, 101, 153, 205, 50, 102, 154, 206, 51, 103, 155. This indicates that the parity byte PB0 should be placed at location 202 in packet 0 so that its position after the interleaver is 187 in packet 0. Similarly, parity byte PB1 has to be placed at location 47 and so on.

It is observed that for some packets, the parity bytes may fall into packet header positions (m =0, 1 or/and 2), i.e., "m" should not equal to 0. 1 or 2, since the first three locations of a packet are reserved for the three null header bytes. To avoid this situation, the range of 'n' may be increased by the number of parity bytes falling into header positions (up to 3). Thus, when calculating 20 values of "m" for different packet numbers, it is observed that when "k mod 52"=1-7, some of these "m" values are 0, 1 and/or 2. For instance, when "k mod 52"=0, it is observed that none of the "m" values fall in the header bytes' location. In this case, all the 20 "m" values are desginated as the parity place holder locations. When "k mod 52"=1, it is observed that one of the "m" values is 0 (which is a header byte). In this case, the "n" range is extended by 1 such that "n" becomes 186-206. Thus, 21 "m" values are calculated and those "m" values that fall into header bytes location are discarded. The remaining 20 "m" values are designated as parity place holder locations. When "k mod 52"=2, it may be observed that two of the calcuated "m" values happen to be 0 and 1 (which are header bytes). In this case, the "n" range is extended by 2 such that "n" is now 185–206. Thus, 22 "m" values (20+2 additional) are calculated and the "m" values that fall into header byte location are discarded. The remaining 20 "m" values are designated as parity place holder locations. Table 4 gives the packets numbers for all other exception cases. It also gives the number of additional 'm' values to be calculated.

TABLE 4

| Packet number mod 52 | Additional 'm' values to be calculated | Range of 'n' |
| --- | --- | --- |
| 0 | 0 | 187–206 |
| 1 | 1 | 186–206 |
| 2 | 2 | 185–206 |
| 3 | 3 | 184–206 |
| 4 | 3 | 184–206 |
| 5 | 3 | 184–206 |
| 6 | 2 | 185–206 |
| 7 | 1 | 186–206 |
| 8–51 | 0 | 187–206 |

More particularly, as shown in FIG. 10, as each packet 450 comprises 207 byte, the basic formatted will split this into two new packets 451, 452 each comprising 207. The parity place-holder insertion mechanism performed by the packet formatter particularly processes each of the new packets 451,452 to include 20 parity bytes at interleaved locations 460a, 460b, . . . , etc. and 3 header bytes 454. Thus, from new packets 451, 452, the packet formatter will generate new packets 451', 452' so as to accommodate all parity and header bits. Thus, new packet 451' of 207 byte include 184 bytes of 451, 20 parity place holders and 3 null header bytes 454. As shown in FIG. 10, this implies that one original data packet 450 will be mapped into three new packets 451', 452' and a third 453' with first two completely filled while the third 453' being only partially filled. Before inserting a data byte into the new packet 451', 452', 453', the location is checked to see if it belongs to a parity byte. If the location doesn't correspond to any of the parity bytes' location then the data byte is placed in that location. If the location belongs to a parity byte then that byte location is skipped and the next byte position is checked. The process is repeated until all the bytes are placed in the new packets. As a result of this translation, each of the 9 output packets include 92 bytes from the input packets (e.g., input packet 450). In one embodiment, a minimum granularity of 9 segments is chosen for NRP when NRS=1. When data is read in at the randomizer, 4 packets of a 9-packet block will contain information bytes while the remaining 5 packets will not contain any information. The packet formatter spreads the information in the 4 packets into 9 packets through the process described above. This ensures that the payload data rate will not be given up any more than is necessary.

With the newly proposed technique of the invention, several bits have to be transmitted to a receiver device so that the receiver device may decode the correct mode of transmission. This mode typically includes the number of robust packets, the type of modulation and the level of redundancy inserted for trellis encoding. This information may be transmitted in the reserved bit portion of the field sync segment 138.

Particularly, in order to reliably detect the transmitted information, additional encoding bits are necessary. According to a preferred embodiment, a spread-spectrum type code is provided to encode each information bit into N bits as now illustrated:

For example, bit 1 may be encoded as b, where b={1 1 0 0 1 1 0 0}. In this case N=8. Then, a bit 0 may be encoded as {1 1 1 1 1 1 1 1} xor b, resulting in {0 0 1 1 0 0 1 1}. Each bit is encoded in this manner and inserted in the field sync. Thus, at the HDTV receiver, standard correlation algorithms may be employed to detect the transmitted bits. This encoding technique provides a means by which detection of the information bits may be achieved under extremely severe interference conditions using simple decoding hardware.

The proposed DTV systems require transmission of a number of bits. For example, 2 bits for representing the modulation type, 1 bit for representing the trellis coding redundancy, 4 bits for representing the number of robust packets per field, and 1 bit for representing Reed-Solomon information. A total of 8 bits need to be transmitted in this example. If each bit is encoded into 8 bits, then a total of 64 bits is needed in the field sync segment (i.e., $8^2$). As this would occupy most of the reserved bits in the data segment sync, then as a way of reducing the number of bits occupied by these bits, the encoded bits may be grouped into two, each of 32-bit length. Then one group will be sent during an even field transmission (e.g., when the middle PN63 of the A53 ATSC standard is not inverted) and the other 32 bits may be sent during the odd field transmission (when the middle PN63 is inverted). In this manner, the existing field sync sequence structure is exploited to reduce the number of bits needed to be transmitted per field.

An alternative technique may require the addition of one (1) encoded bit that conveys the type information carried by the group of bits. In this manner, the group of bits need not be tied with the type of the field sync.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A digital signal transmission system for transmitting encoded bit streams including a normal bit stream and a robust bit stream, said system comprising:

first forward error correction (FEC) unit for encoding the normal bit stream and the robust bit stream;

a robust processor unit for receiving and processing said encoded robust bit stream to generate a processed robust bit stream and passing through said encoded normal bit stream as an unaltered encoded normal bit stream;

a trellis encoder unit for receiving the unaltered encoded normal bit stream and the processed robust bit stream, and for producing a stream of trellis encoded data bits corresponding to bits of said unaltered encoded normal bit stream and bits of said processed robust bit stream;

a second forward error correction (FEC) unit for reading in only portions of said trellis encoded data bits corresponding to said bits of said processed robust bit stream from the trellis encoder unit and enabling generation of parity bytes only for said processed robust bit stream; and a transmitter device for transmitting said stream of trellis encoded data bits corresponding to said bits of said unaltered encoded normal bit stream and said bits of said processed robust bit stream including said parity bytes over a communication channel to a receiver device.

2. The digital signal transmission system as claimed in claim 1, wherein said receiver device is capable of at least one of:
  receiving the stream of trellis encoded data bits and processing the processed robust bit stream as null packets; and
  receiving the stream of trellis encoded data bits and processing the processed robust bit stream at a lower Threshold of Visibility (TOV) compared to the unaltered encoded normal bit stream.

3. The digital signal transmission system as claimed in claim 1, wherein said robust processor unit comprises:
  an interleaver for receiving encoded robust packets including said encoded robust bit stream and interleaving said encoded robust packets; and
  packet formatter for processing the encoded robust packets in accordance with one or more symbol mapping schemes;
  said packet formatter for reading robust bytes from the interleaver and generating two or more data blocks corresponding to each one of said encoded robust packets to facilitate robust encoding in said trellis encoder unit.

4. The digital signal transmission system as claimed in claim 3, wherein said packet formatter is further capable of arranging information bits of each of said robust bytes into least significant bit (LSB) positions of said two or more data blocks for robust encoding in said trellis encoder unit,
  wherein remaining bits in most significant bit (MSB) positions are subsequently determined based on the one or more symbol mapping schemes.

5. The digital signal transmission system as claimed in claim 4, wherein said packet formatter is further capable of inserting a plurality of placeholder bytes at various locations in each of said two or more data blocks, said placeholder bytes for eventually receiving said parity bytes provided by said second FEC unit.

6. The digital signal transmission system as claimed in claim 5, wherein said packet formatter is further capable of inserting three header bytes in each data block for identifying a particular packet received at the receiver device, wherein the placeholder bytes include a pre-specified location in each of said two or more data blocks for eventually receiving said three header bytes.

7. The digital signal transmission system as claimed in claim 5, wherein said placeholder bytes are inserted at one or more locations comprising byte positions dispersed throughout each data block, said one or more locations of placeholders bytes in each of said data block located to result in placement of the parity bytes in contiguous byte positions at the end of said one of said encoded robust packets when interleaved.

8. The digital signal transmission system as claimed in claim 6, wherein the second FEC unit comprises a parity byte generator for de-interleaving bytes obtained after trellis encoding of the processed robust bit stream, said parity byte generator further obtaining parity byte location information for said each one of said encoded robust packets, generating said parity bytes, and placing said parity bytes in said one of said encoded robust packets at said placeholder locations.

9. The digital signal transmission system as claimed in claim 1, further comprising a multiplexer for multiplexing normal packets including said normal bit stream with robust packets including said robust bit stream.

10. The digital signal transmission system as claimed in claim 1, wherein said trellis encoder unit maps encoded data bits of said processed robust bit stream into symbols according to one or more symbol mapping schemes; and wherein said one or more symbol mapping schemes includes one selected from a group comprising: a pseudo 2-VSB symbol mapping scheme, a 4-VSB symbol mapping scheme, and an H-VSB mapping scheme.

11. The digital signal transmission system as claimed in claim 1, wherein said parity bytes are mapped into one of 8-VSB levels according to an Advanced Television Systems Committee (ATSC) standard 8-VSB bit stream standard.

12. The digital signal transmission system of claim 1, wherein the second FEC unit is selectively used to enable generation of the parity bytes.

13. The digital signal transmission system as claimed in claim 1, further comprising an interleaver unit configured to interleave said processed robust bit stream and said unaltered encoded normal bit stream.

14. A method for transmitting digital signals comprising encoded bit streams including a normal bit stream and a robust bit stream, said method comprising the acts of:
  encoding the normal bit stream and the robust bit stream in a first forward error correction (FEC) unit to form an encoded normal bit stream and an encoded robust bit stream;
  processing said encoded robust bit stream to generate a processed robust bit stream;
  producing a stream of trellis encoded data bits from said encoded normal bit stream and said processed robust bit stream, said stream of trellis encoded data bits corresponding to bits of said encoded normal bit stream and said processed robust bit stream;
  reading in only portions of said trellis encoded data bits corresponding to said bits of said processed robust bit stream from a trellis encoder unit and enabling generation of parity bytes only for said processed robust bit stream in a second forward error correction (FEC) unit; and
  transmitting said stream of trellis encoded data bits corresponding to said bits of said encoded normal bit stream and said bits of said processed robust bit stream including said parity bytes over a communications channel to a receiver device.

15. The method for transmitting digital signals as claimed in claim 14, wherein said receiver device is capable of at least one of:
  receiving the stream of trellis encoded data bits and processing the processed robust bit stream as null packets; and
  receiving the stream of trellis encoded data bits and processing the processed robust bit stream at a lower Threshold of Visibility (TOV) compared to the normal bit stream.

16. The method for transmitting digital signals as claimed in claim 14, wherein said act of processing said encoded robust packets comprises the acts of:
  interleaving encoded robust packets including said encoded robust bit stream;
  mapping trellis encoded data bits of said processed robust bit stream into symbols according to one or more symbol mapping schemes; and
  formatting said encoded robust packets in accordance with the one or more symbol mapping schemes, wherein said formatting act includes the act of reading robust bytes produced during interleaving and generating two or more data blocks corresponding to each one of said encoded robust packets.

17. The method for transmitting digital signals as claimed in claim 16, wherein said formatting act further includes the act of:
  arranging information bits of each of said robust bytes into least significant bit (LSB) positions of said two or more data blocks for robust encoding, wherein remaining bits in most significant bit (MSB) positions are determined based on the one or more symbol mapping schemes.

18. The method for transmitting digital signals as claimed in claim 16, wherein said formatting act further comprises the act of inserting a plurality of placeholder bytes at various locations in each of said two or more data blocks, said placeholder bytes for eventually receiving said parity bytes provided by said second FEC unit.

19. The method for transmitting digital signals as claimed in claim 18, wherein said formatting act further comprises the act of inserting three header bytes in each data block for identifying a particular packet received at the receiver device, wherein the placeholder bytes include a pre-specified location in each of said two or more data blocks for eventually receiving said three header bytes.

20. The method for transmitting digital signals as claimed in claim 19, wherein the act of reading the portions and enabling generation of the parity bytes comprises the acts of:
de-interleaving bytes obtained after trellis encoding of the processed robust bit stream;
obtaining parity byte location information for said each one of said encoded robust packets including said processed robust bit stream;
generating said parity bytes; and
placing said parity bytes in said one of said encoded robust packets at said placeholder locations.

21. The method for transmitting digital signals as claimed in claim 18, wherein said plurality of placeholder bytes are inserted at one or more locations comprising byte positions dispersed throughout each data block, said one or more locations of placeholders bytes in each of said data block located to result in placement of the parity bytes in contiguous byte positions at the end of said one of said encoded robust packets in a subsequent interleaving act.

22. The method for transmitting digital signals as claimed in claim 14, further including the act of multiplexing normal packets including said normal robust bit stream with robust packets including said processed robust bit stream.

23. The method for transmitting digital signals as claimed in claim 14, further comprising the act of mapping trellis encoded data bits of said processed robust bit stream into symbols according to one or more symbol mapping schemes using said trellis encoder unit, wherein said act of mapping includes utilizing a symbol mapping scheme selected from a group comprising: a pseudo 2-VSB symbol mapping scheme, a 4-VSB symbol mapping scheme, and an H-VSB mapping scheme.

24. The method of claim 14, wherein enabling generation of the parity bytes comprises selectively enabling generation of the parity bytes.

25. The method for transmitting digital signals as claimed in claim 14, further comprising the act of interleaving said processed robust bit stream and said normal encoded normal bit stream prior to said producing act.

26. A high-definition digital television signal transmission system for transmitting encoded MPEG-compatible data packets for receipt by a digital television receiver device, said packets including a normal bit stream and a robust bit stream, said system comprising:
a first forward error correction (FEC) unit for formatting the normal bit stream and the robust bit stream;
a robust processor unit for receiving and processing said encoded robust bit stream to generate a processed robust bit stream and passing through said encoded normal bit stream as an unaltered encoded normal bit stream;
a trellis encoder unit for receiving said unaltered encoded normal bit stream and said processed robust bit stream, and for producing a stream of trellis encoded data bits corresponding to bits of said unaltered encoded normal bit stream and bits of said processed robust bit stream, said trellis encoder unit mapping encoded data bits of said encoded robust bit stream into symbols according to one or more symbol mapping schemes;
a second forward error correction (FEC) unit for reading in only portions of said trellis encoded data bits corresponding to said bits of said processed robust bit stream from the trellis encoder unit and enabling generation of parity bytes only for said processed robust bit stream; and
a digital television signal transmitter device for:
transmitting said stream of trellis encoded data bits in a backwards compatible manner over a communications channel to said receiver device, said stream of trellis encoded data corresponding to said bits of said unaltered encoded normal bit stream and said bits of said processed robust bit stream including said parity bytes; and
transmitting bits for receipt by said receiver device including information to enable the receiver device to correctly decode the symbols according to the one or more symbol mapping schemes; and
wherein the receiver device is capable of at least one of: (i) receiving the stream of trellis encoded data bits and processing said processed robust bit stream as null packets and (ii) receiving the stream of trellis encoded data bits and processing said processed robust bit stream at a lower Threshold of Visibility (TOV) compared to the normal bit stream.

27. The high-definition digital television signal transmission system as claimed in claim 26, wherein said transmitted bits for receipt by said receiver device include information bits characterizing a digital signal transmission mode according to a number of robust packets including said encoded robust bit stream, a type of modulation, and a level of redundancy inserted for trellis encoding.

28. The high-definition digital television signal transmission system as claimed in claim 26, wherein each of said transmitted information bit is spread spectrum encoded prior to transmission, said bits encoded for transmission in a reserved bit portion of a data field sync segment.

29. The high-definition digital television signal transmission system as claimed in claim 26, wherein said information bits represent:
said one or more symbol mapping schemes, said one or more symbol mapping schemes including at least one selected from a group comprising: 2-VSB, 4-VSB and H-VSB symbol mapping modes; and
an indication of whether said second FEC unit was utilized.

30. The high-definition digital television signal transmission system of claim 26, wherein the second FEC unit is selectively used to enable generation of the parity bytes.

31. The high-definition digital television signal transmission system as claimed in claim 26, further comprising an interleaver unit configured to interleave said processed robust bit stream and said unaltered encoded normal bit stream.

* * * * *